United States Patent [19]
Kessler

[11] 3,790,985
[45] Feb. 12, 1974

[54] WIPER ARRANGEMENT FOR WINDSHIELDS AND THE LIKE

[75] Inventor: Peter-Jürgen Kessler, Buhlertal, Germany

[73] Assignee: Robert Bosch G.m.b.H., Stuttgart, Germany

[22] Filed: June 12, 1972

[21] Appl. No.: 261,937

[30] Foreign Application Priority Data
July 2, 1971 Germany............................ 2133077

[52] U.S. Cl................................ 15/250.34, 74/18.1
[51] Int. Cl............................. B60s 1/18, B60s 1/04
[58] Field of Search ....... 74/18.1; 15/250.34, 250.3; 287/53 W, 53 A; 64/1 S, 23

[56] References Cited
UNITED STATES PATENTS
| | | | |
|---|---|---|---|
| 1,959,259 | 5/1934 | Zerk ................................. | 74/18.1 |
| 3,279,832 | 10/1966 | Bergman............................ | 74/18.1 |
| 2,467,370 | 4/1949 | Christensen ........................ | 74/18.1 |

FOREIGN PATENTS OR APPLICATIONS
1,900,185  10/1970  Germany........................... 15/250.3

Primary Examiner—Leon G. Machlin
Attorney, Agent, or Firm—Michael S. Striker

[57] ABSTRACT

A bushing is to be mounted in a wall of the vehicle, and the wiper assembly is journalled in the bushing for oscillatory rotation. The assembly includes an arm which carries a wiper blade, and which is in turn mounted on a shaft journalled in the bushing. A sealing device is provided to prevent the entry of contaminants at the axial end of the bushing from which the shaft extends to the arm. The sealing device is in form of a sleeve of elastomeric or similar material with one end of the sleeve surrounding the axial end of the bushing and being connected therewith, and the other end surrounding the shaft and being connected with the latter in the region of the arm, or with the hub of the arm itself, in such a manner that the sleeve will tend to follow the rotation of the shaft and flex in response to such rotation.

11 Claims, 4 Drawing Figures

Patented Feb. 12, 1974

3,790,985

WIPER ARRANGEMENT FOR WINDSHIELDS AND THE LIKE

BACKGROUND OF THE INVENTION

The present invention relates generally to a wiper arrangement, and more particularly to a wiper arrangement for use on vehicles, such as motor vehicles. Still more particularly, the invention relates to a wiper arrangement for windshields or the like in vehicles, for instance also rear windows, headlight covers and the like.

Generally speaking, such wiper arrangements include a bushing which is mounted in a structural element of the vehicle and through which an oscillatorily rotatable shaft extends. A free portion of the shaft is exposed at the exterior of the bushing — and of the vehicle — and carries an arm which moves and oscillates with the shaft. A wiper blade is in turn carried by the arm and engages a windshield or the like of the vehicle. To prevent the entry of contaminants into the bushing journalling the shaft, there is provided a sealing arrangement.

According to a prior-art construction of this type, this sealing arrangement is connected with the bushing and has an annular flexible sealing lip which extends to a cylindrical wall of the hub of the wiper arm, with the hub being mounted on the shaft for rotation therewith. This sealing lip is in sealing engagement with the hub and this prior-art construction does in fact provide for effective sealing against the entry of contaminants. However, due to the fact that the sealing arrangement and in particular the flexible sealing lip thereof is stationary, being carried by the bushing, whereas the hub rotates in contact with the sealing lip, it has been found that over a period of time, sufficient wear will take place on the sealing lip to breech the seal and to finally allow the entry of contaminants which can then reach the bushing.

SUMMARY OF THE INVENTION

It is, accordingly, an object of the present invention to provide an improved wiper arrangement of the type here under discussion which is not possessed of the disadvantages of the prior art.

More particularly, it is an object of the present invention to provide such an improved wiper arrangement which will not only provide for very reliable sealing against the entry of contaminants, but which will maintain its sealing effectiveness over long periods of time.

In pursuance of these objects and of others which will become apparent hereafter, one feature of the invention resides in a wiper arrangement for windshields and the like which, briefly stated, comprises a combination of a bushing adapted to be mounted in a structural element of a vehicle, and a wiper assembly which includes a shaft journalled in the bushing for oscillatory rotation and having a projecting portion extending beyond an axial end of the bushing. The wiper assembly further includes a wiper arm mounted on and movable with the shaft and a wiper blade carried by the wiper arm. There is further provided means for preventing the entry of contaminants at the axial end of the bushing. In accordance with the invention this means comprises a sealing component sealingly engaging the bushing and having a resiliently deformable portion surrounding the axial end and the projecting portion of the shaft, such sealing component being fast with the wiper assembly so as to undergo resilient deformation in response to oscillatory rotation of the same.

There is thus no longer any movement of the wiper assembly relative to the sealing component, causing the wear of the sealing component that in the prior art results in eventual loss or breeching of the seal. This results in a significantly increased lifetime of the arrangement according to the present invention.

It is advantageous if the resiliently deformable portion of the sealing component is fast with the shaft of the wiper assembly, although the arm of the wiper assembly can be provided with a hub which is mounted on and fast with the shaft, and the resiliently deformable portion of sealing component can be made fast with this hub rather than directly with the shaft.

It is particularly simple to assemble the novel arrangement if the sealing component is configurated as a thin-walled tubular element having opposite open ends which are reinforced by resiliently distendable beads which are distended and slipped onto the bushing and the shaft (or the hub) to engage them under tension. The retention of the sealing component is facilitated if annular grooves are provided on the bushing and the shaft (or the hub) in which the annular ribs are located under pretension.

According to a further concept of the invention, it is also advantageous to provide the sealing component with longitudinally extending reinforcing ribs, that is reinforcing ribs which extend from one to the other of the annular reinforcing ribs provided at the opposite open ends. These longitudinally extending reinforcing ribs are circumferentially spaced and are advantageously, although not necessarily, provided at the inner side of the circumferential wall of the tubular sealing component with the wall intermediate the various reinforcing ribs being preferably rather thin so as to have in effect the characteristic of a readily foldable skin. In this case, the longitudinally extending reinforcing ribs serve in effect the same purpose as a frame, which imparts a tubular configuration to the sealing component but without preventing folding of the circumferential wall thereof intermediate the longitudinally extending rib.

It is also advantageous that the circumferential wall of the tubular sealing components be provided with at least one circumferentially extending fold or corrugation and between at least two circumferentially adjacent ones of the longitudinally extending ribs there may be provided in the circumferential wall a longitudinally extending fold or corrugation. In such a construction the tensile forces which act upon the sealing component when one of its ends is held stationary on the bushing, whereas the other end turns with the shaft or the hub of the arm, can be accommodated without any difficulties because the folds will tend to straighten out in response to the exertion of such forces, but no stretching of the material of the component will take place.

It is advantageous to make the sealing component not only of an elastically yieldable material but of a material which is impervious or at least resistant to attack by such lubricants (e.g. oil) with which it is likely to come in contact, that is for instance lubricants which are used to lubricate the shaft of the assembly.

The novel features which are considered as characteristic for the invention are set forth in particular in

DESCRIPTION OF THE PREFERRED EMBODIMENTS

Figure 1:
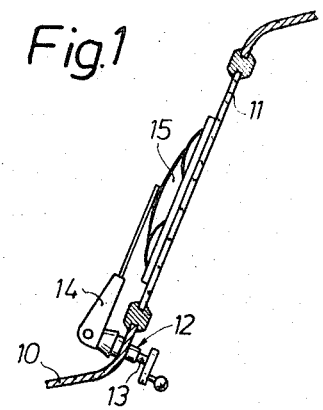
FIG. 1 is a diagrammatic fragmentary vertical section through the windshield region of a vehicle, illustrating a wiper arrangement according to the present invention being provided on this region.

Discussing the drawing now in detail, and firstly referring to FIG. 1, it will be seen that reference numeral 10 diagrammatically designates a structural component or element of a vehicle, for instance of a motor vehicle. This may be the wall of the vehicle in which, for instance, the windshield 11 is mounted. In conventional manner, a bushing 12 is mounted in a suitable aperture provided in the wall 10, and a shaft 13 of a wiper assembly according to the present invention extends through and is journalled in the bushing 12. The outer end portion of the shaft 13, that is the one which is exposed at the exterior of the vehicle and of the windshield 11, carries a wiper arm 14, which in turn is provided with a conventional wiper blade 15. When the shaft 13 is made to alternately rotate in clockwise and counterclockwise direction, that is to undergo oscillatory rotation, the arm 14 will perform similar movements and the blade 15 will wipe back and forth of the windshield 11 in known manner. Means for effecting rotation of the shaft 13 is not illustrated because it is not essential for an understanding of the invention and well known from conventional windshield wiper drives known to those skilled in the art.

Figure 2:
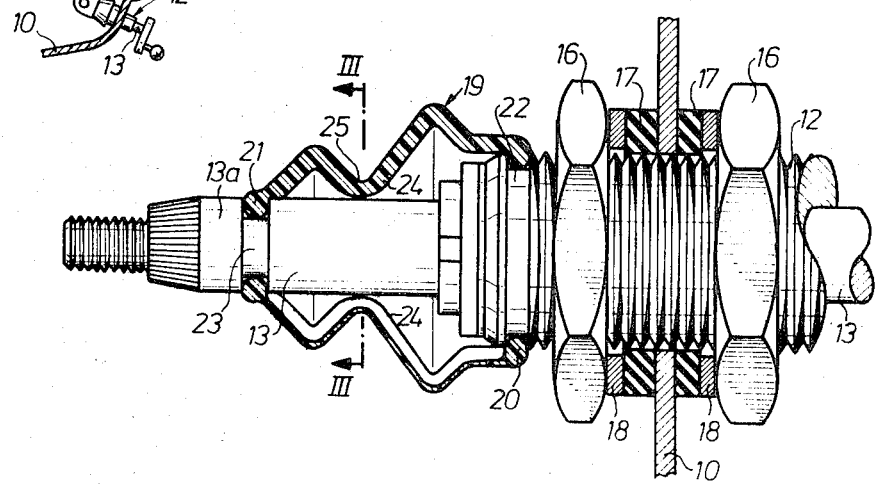
FIG. 2 is an axial section on an enlarged scale, taken on line II—II of FIG. 3.
Figure 3:
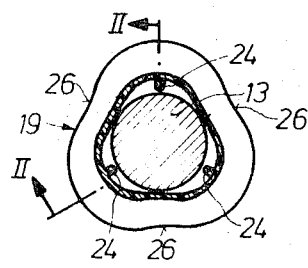
FIG. 3 is a section taken on line III—III of FIG. 2.

Discussing now FIGS. 2 and 3 it will be seen that according to the embodiment illustrated in these Figures, the bushing 12 is provided with an external thread and is extended through the opening in the wall 10, as illustrated. At opposite sides of the wall 10, there is slipped over the exterior of the bushing 12 a sealing gasket 17 and a washer 18, respectively, and nuts (here illustrated as hex-nuts) 16 are threaded from opposite axial ends onto the bushing 12 to retain it in place by bearing upon the respective gaskets 17, and washers 18 and pressing the same against the wall 10. This manner of mounting the bushing 12 is not novel.

In FIG. 2 it is the left-hand portion of the bushing 12 which is exposed at the exterior side of the wall 10, that is the side where the entry of contaminants into the bushing 12 is most likely. A shaft 13 extends through and is journalled in the bushing 12 for the aforementioned oscillatory rotation, having a projecting portion which extends outwardly beyond the exposed or outer axial end of the bushing. Mounted on the portion 13a of the shaft 13 is the arm 14 of the wiper assembly, (not shown in FIG. 2).

According to the present invention, the means for preventing the entry of contaminants at the outer or exposed axial end of the bushing 12 is provided in form of a tubular resiliently deformable sealing component 19. The component 19 extends from the region inwardly of the exposed axial end of the bushing 12 to the portion 13a of the shaft 13. The bushing 12 itself is of course stationary and so is the end of the component 19 which is connected therewith. The shaft 13, on the other hand, performs oscillatory rotational movements and because the end of the component 19 which is connected with the shaft 13 is so connected as to move with the same, the component 19 will tend to follow such rotational movements.

According to the invention, the circumferential wall of the component 19 advantageously has the character of a readily foldable skin. The opposite open ends of the component 19 are reinforced by annular circumferentially extending ribs or beads 20 and 21, respectively, and the bushing 12 and the portion 13a of the shaft 13 are respectively provided with circumferentially extending grooves 22 and 23. The component 19 is connected with the bushing 12 and with the shaft 13 by radially expanding or distending its ribs 20, 21 and slipping the component 19 over the shaft and bushing, whereupon the rib 20 is allowed to contract and engage in the groove 22 and the rib 21 is allowed to contract and engage in the groove 23. The ribs therefore engage the respective grooves under pre-tension and provide a proper seal. At the same time, the engagement is sufficiently tight so that no relative movement of the component 19 with respect to either the bushing or the shaft 13 can occur except as the component 19 flexes in its attempt to follow the movements of the shaft 13.

In addition, the circumferential wall (here the inner side thereof) of the sealing component 19 is provided with a plurality of circumferentially distributed longitudinally extending reinforcing ribs 24 (see FIG. 3 in particular) which extend from or from the region of the rib 20 to or to the region of the rib 21. They in effect constitute a framework which maintains the sealing component 19 in its desired shape without, however, preventing the flexing of the thin wall intermediate the ribs 24.

In addition, the component 19 is advantageously provided with at least one circumferentially extending fold or corrugation 25, and at at least one longitudinally extending fold or corrugation 26 (see FIG. 3 where three of these are shown) located between circumferentially adjacent ones of the longitudinally extending ribs 24. It is advantageous to mount the component 19 with the shaft 13 having a position in which it is midway between its opposite reversal points, that is the points at which it reverses its direction of rotation. In other words, the shaft 13 is turned to this substantially midway position and thereupon the component 19 is installed as previously discussed.

When the shaft 13 rotates the component 19 and its ribs 24 (if such are provided) tends to become helically twisted about the shaft 13, to a greater or lesser degree depending on the wiping angle of the arrangement. This possible, and possible without any difficulties, because the tensile forces which develop and act upon the component 19, do not cause the same to stretch but instead simply cause the fold 25 to alternately become flattened out and return to its position shown in FIG.

2. The folds 26 on the other hand effect a controlled folding of the thin wall portions intermediate the ribs 24. Because the component 19 is therefore at no time subjected to actual stretching, any damage to the component 19 due to the action upon it of mechanical stresses is avoided.

Figure 4:
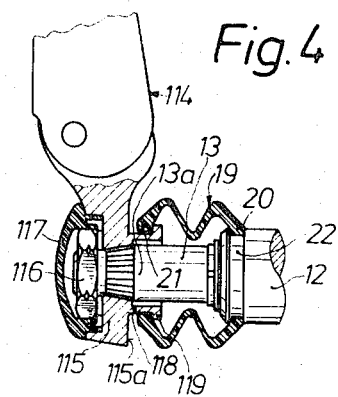
FIG. 4 is a fragmentary axial section illustrating a further embodiment of the invention.

The embodiment of FIG. 4 is somewhat different from that of FIGS. 2 and 3, in that the wiper arm 114 is here provided with an appropriately configurated hub 115 having an opening into which the portion 13a of the shaft 13 extends. The arm 114 is retained by means of a nut 116 and the latter is in turn covered by a cap 117 which may be of synthetic plastic material.

The end face 115a of the hub 115 which faces towards the bushing 12 is provided with a collar 118 which surrounds the bore of the hub and which is delimited at its free axial end by a circumferentially extending bead 119. There is thus formed an annular recess in which the annular rib 21 is retained, having been permitted to snap into this recess in the manner discussed earlier with respect to FIGS. 2 and 3.

In other respects the embodiment in FIG. 4 corresponds to what has been discussed with respect to FIGS. 2 and 3, including the fact that the rib 20 is received under pre-tension in a groove 22 provided adjacent the exposed axial end of the bushing 12.

It will be understood that each of the elements described above, or two or more together, may also find a useful application in other types of constructions differing from the types described above.

While the invention has been illustrated and described as embodied in a wiper arrangement, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a wiper arrangement for windshields and the like, in combination, a bushing adapted to be mounted in a structural element of a vehicle; a wiper assembly, including a shaft journalled in said bushing for oscillatory rotation and having a projecting portion extending beyond an axial end of said bushing, a wiper arm movable with said shaft and including a hub mounted on the same, and a wiper blade carried by said wiper arm; and means for preventing the entry of contaminants at said axial end of said bushing, said means comprising a sealing component sealingly engaging said bushing and having a resiliently deformable portion surrounding said axial end and said projecting portion of said shaft, and a fastening portion fastening said deformable portion to said hub so that said deformable portion undergoes resilient deformation in response to oscillatory rotation of said wiper assembly.

2. In an arrangement as defined in claim 1, said hub having a bore for said projecting shaft portion, and a collar surrounding said bore; and wherein said fastening portion is annular and engages said collar.

3. In an arrangement as defined in claim 1, said sealing component being tubular and having a resiliently flexible circumferential wall.

4. In an arrangement as defined in claim 1, said sealing component being of a resiliently flexible material which is at least resistant to lubricating agents.

5. In an arrangement as defined in claim 1, said sealing component being tubular and having opposite open ends, and resiliently distendable annular reinforcing ribs provided at the respective ends encircling the openings thereof.

6. In an arrangement as defined in claim 5, said bushing and said wiper assembly each having at least one circumferential groove; and wherein said annular reinforcing ribs are each received in distended condition in one of said grooves.

7. In an arrangement as defined in claim 5, said sealing component having a resiliently deformable circumferential wall, and a plurality of circumferentially offset elongated reinforcing ribs extending longitudinally of said tubular sealing component from one to the other of said annular reinforcing ribs.

8. In an arrangement as defined in claim 7, said circumferential wall having an inner side, and said elongated reinforcing ribs being provided on said inner side.

9. In an arrangement as defined in claim 7, wherein said wall constitutes intermediate said reinforcing ribs a readily foldable and flexible skin.

10. In an arrangement as defined in claim 5, said tubular sealing component having intermediate said annular reinforcing ribs at least one circumferentially extending corrugation.

11. In an arrangement as defined in claim 7, said circumferential wall being provided intermediate at least two circumferentially adjacent ones of said elongated reinforcing ribs with at least one longitudinally extending corrugation.

* * * * *